United States Patent [19]
Virga et al.

[11] Patent Number: 5,094,119
[45] Date of Patent: Mar. 10, 1992

[54] FLEXIBLE RIBBED, NO-BACKLASH BALL NUT

[75] Inventors: Joseph P. Virga, Citrus Heights, Calif.; Glenn R. Simpson, III, Hartland, Wis.

[73] Assignee: Robec, Inc., San Carlos, Calif.

[21] Appl. No.: 678,538

[22] Filed: Mar. 29, 1991

[51] Int. Cl.$^5$ ............................................. F16H 55/22
[52] U.S. Cl. ..................................... 74/459; 74/89.15
[58] Field of Search ................... 74/89.15, 216.3, 459

[56] References Cited

U.S. PATENT DOCUMENTS

| | | | |
|---|---|---|---|
| 3,831,460 | 8/1974 | Linley, Jr. | 74/459 |
| 4,660,431 | 4/1987 | Heine | 74/89.15 |
| 4,896,552 | 1/1990 | Virga | 74/89.15 |

FOREIGN PATENT DOCUMENTS 0214178 10/1984 Fed. Rep. of Germany ........ 74/459

Primary Examiner—Dirk Wright
Attorney, Agent, or Firm—Flehr, Hohbach, Test, Albritton & Herbert

[57] ABSTRACT

A ball screw assembly (10) includes a ball nut (12) and a lead screw (14). The ball nut (12) has a construction which provides both a flexiblility comparable to that achieved with a coil spring ball nut design and a stiffness of a solid ball nut body. The ball nut (12) consists of three sections: a head (16), a tail (18) and a connecting section (20). The connecting section (20) contains most of a ball circuit (22) in the form of a helical track (24), along which ball bearings (14) travel as the ball nut (12) and the lead screw (14) rotate with respect to each other. A plurality of separate slots (32) are provided, essentially along the helical track (24) of the ball circuit (22). The slots (32) are interrupted by a solid spine (34) along the length of the connecting section (20). Segments (36) of the connecting section (20) between the slots (32) form ribs connected to the backbone or spine (34). The spine (34) provides stiffness for the ball nut (12) and the rib segments (36) flex to compensate for variations in threads (38) of the lead screw (14).

15 Claims, 5 Drawing Sheets

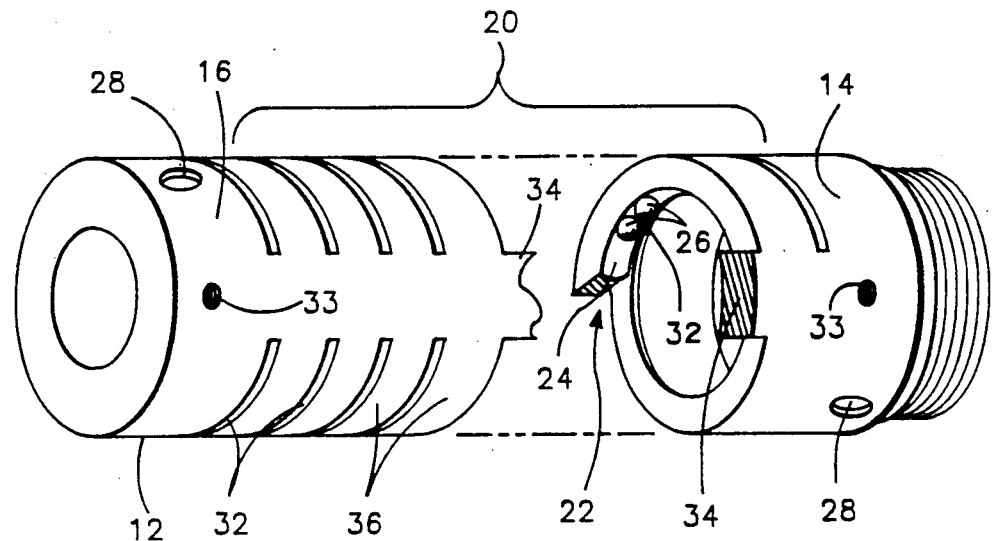
FIG.—1
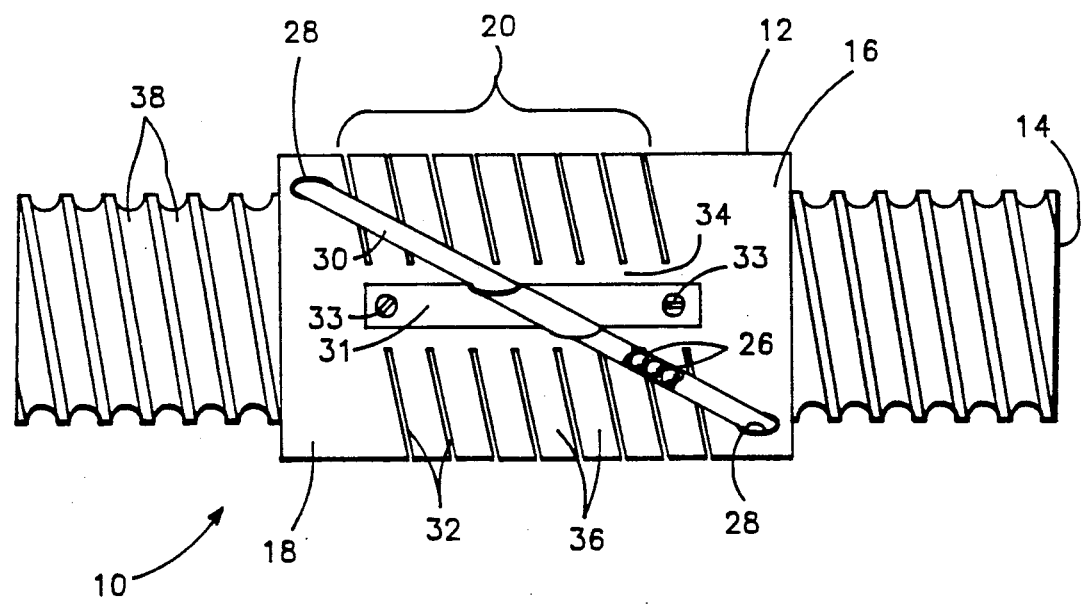
FIG.—2

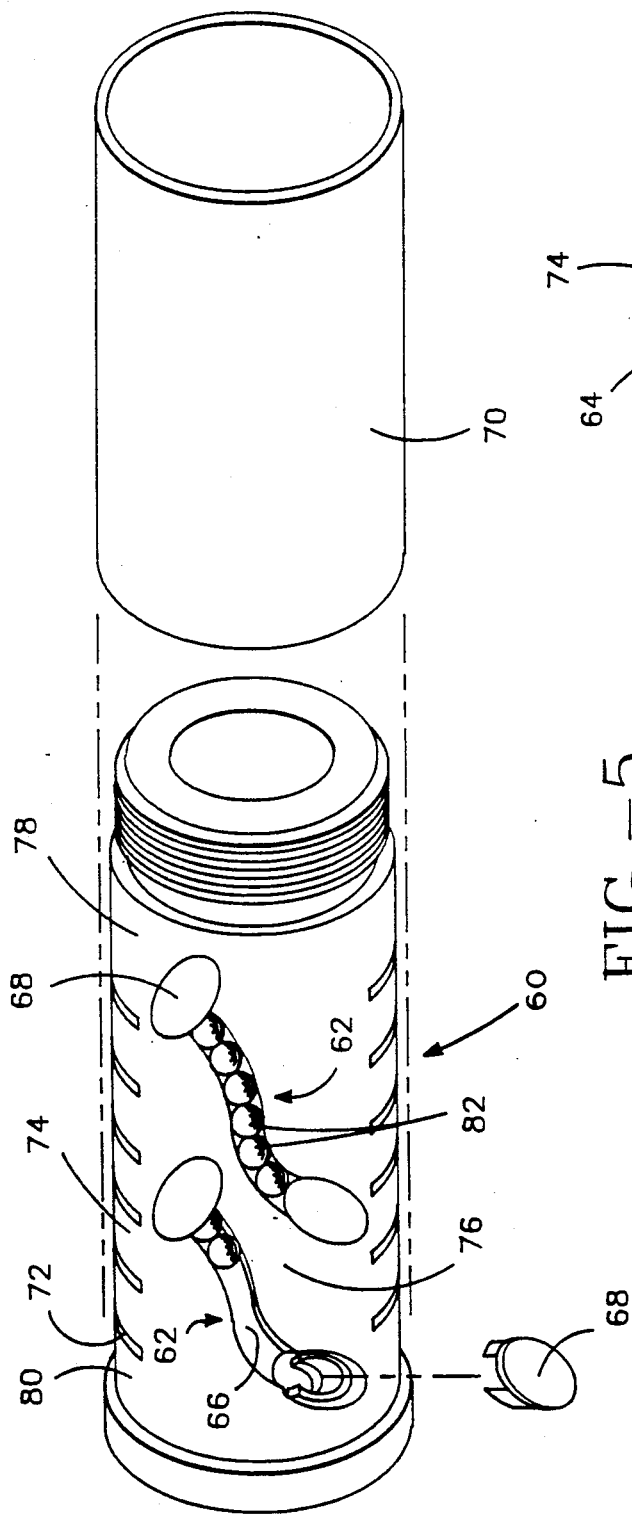
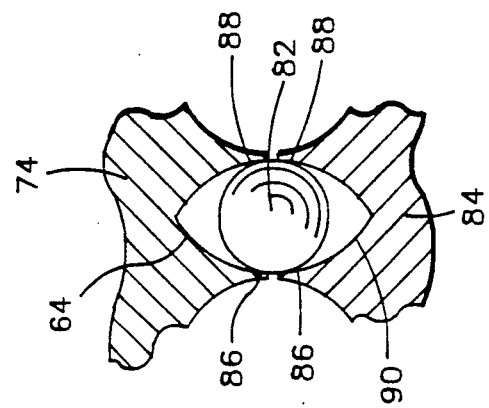
FIG.-5
FIG.-6

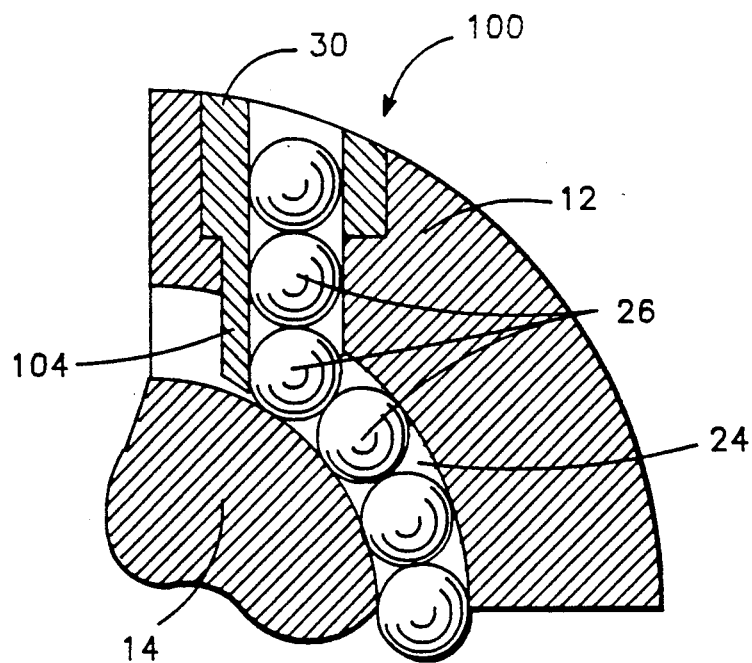
FIG.—7
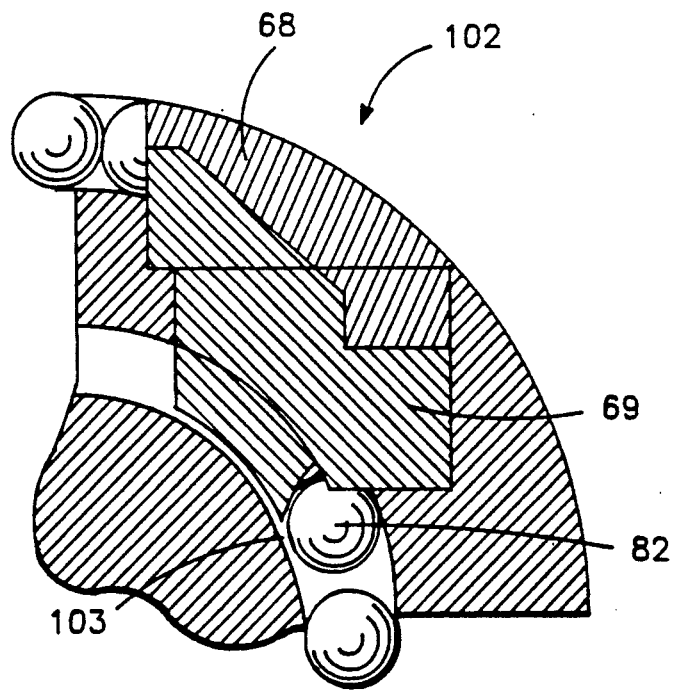
FIG.—8

FLEXIBLE RIBBED, NO-BACKLASH BALL NUT

BACKGROUND OF THE INVENTION

1. Field of the Invention

The present invention relates generally to an improved ball nut for use in combination with ball screws to give a positioning assembly. More particularly, it relates to such a ball nut which incorporates flexibility while being suitable for use with relatively large diameter ball screws and with relatively heavy loads. Most especially, it relates to such a ball nut and positioning assembly that provides a high repeatability in positioning.

2. Description of the Prior Art

There is a growing market and ever increasing demand for ball screw assemblies that have high repeatability. Repeatability refers to the ability to position along the axis of the ball screw, make a move and then return to the previous position very accurately. Backlash in the ball screw assembly reduces the accuracy of the system's repeatability. Backlash is the 'play' or 'lost motion' in the ball screw assembly. Preloading ball nuts onto ball screws is a common practice in the ball screw industry.

Conventional ball screw assemblies use a ball screw with a helical groove along its length, and a ball nut with a mating groove that interacts with the lead screw groove to form a race for ball bearings positioned between the grooves of the lead screw and the ball nut. The ball bearings move in rolling contact in the grooves as the lead screw and the ball nut are rotated with respect to one another. A return path is provided as part of the ball nut so that the ball bearings are constantly recirculated in the race as the lead screw and ball nut continue to rotate with respect to each other.

There are three basic methods for removing backlash from the ball screw assembly currently in use. A technique known as the 'solid preload' achieves its goal by creating an interference fit between the ball nut and the ball screw by filling the ball race with ball bearings that are slightly larger than the actual space in the ball race. Another solid preloading technique is to force two separate ball nuts either apart or together with a solid member. Solid preloading is almost exclusively limited to use with high precision ground ball screw assemblies.

The second method is applied to both high precision grade assemblies and the commercial grade called 'rolled thread'. This method involves two separate ball nuts assembled to the ball screw with a preloading device. Most commonly, this device is a set of collars and springs that bias the separate nuts apart and, at the same time, holds them in relationship to each other. These designs create a somewhat flexible assembly and are usually used with rolled thread ball screw assemblies.

The third method employs the spring nature of the hardened ball nut material. A helical flexure is created in the body of the ball nut within its ball circuit. This flexure results in the ball circuit actually becoming a dynamic preloading coil spring. This spring design allows the ball nut to run along the lead screw with the coil spring constantly adjusting to oscillating motion of the lead screw caused by irregularities in the lead screw as translated through the ball bearings while continually applying a preload to the ball screw assembly. This design is presently applied exclusively to the rolled grade ball screw assemblies. This design is the subject of my prior U.S. Pat. No. 4,896,552, issued Jan. 30, 1990.

The above three preloading methods all have one of two drawbacks that limit their effectiveness. The solid preload lacks any flexibility. It cannot self adjust to variations in the ball screw thread and can therefore only be used with very expensive, high precision ball screws with any reliability. Variations in the ball screw thread are found in all grades, but are greater in the commercial rolled grade than in the precision grade. The primary advantage of the solid preload is in its stiffness, which makes it suited for applications producing a high load on the ball screw.

The preloading collar double nut design offers some flexibility through the spring(s) in the collar arrangement. However, the small gains in flexibility are offset by the loss of stiffness in the ball nut assembly. Because the spring in this unit can supply only a marginal amount of flex, these assemblies tend to run roughly, and not well at all when applied to small diameter lead ball screw assemblies.

The third method of turning the ball circuit into a preloading coil spring offers superior flexibility over both of the above designs. This design works very well where others do not. However, this design lacks stiffness. Such a flexible coil spring cannot offer high stiffness. This design is therefore limited to use with low to moderate loads, where stiffness is less necessary.

SUMMARY OF THE INVENTION

Accordingly, it is an object of this invention to provide a ball nut and a ball screw assembly having a sufficient flexing ability to accommodate irregularities in lead screw pitch, yet having sufficient stiffness to allow the use of large diameter lead screws and relatively high loads.

It is a further object of the invention to provide such a ball nut and ball screw assembly having the flexibility of the coil spring design coupled with the stiffness of a solid ball nut body.

It is another object of the invention to provide such a ball nut and ball screw assembly that is suitable for use with relatively low precision lead screws, such as rolled thread grade lead screws.

It is still another object of the invention to provide such a ball nut and ball screw assembly which employs only the basic ball nut itself, with no additional hardware required.

It is a further object of the invention to provide such a ball nut and ball screw assembly that can be implemented with ball nuts having an internal ball bearing return path.

The attainment of these and related objects may be achieved through use of the novel ball nut and ball screw assembly herein disclosed. A ball nut in accordance with this invention has a body having a head end, a tail end and a connecting section joining the head end and the tail end. The body has an axial bore extending through the body. The connecting section has a substantially helical path track on the axial bore for receiving a plurality of ball bearings for engaging threads of a lead screw. A solid backbone connects the head end to the tail end. A plurality of separate rib members are attached to the solid backbone and comprise substantially C-shaped segments of a substantially helical shape corresponding to the substantially helical path track. A return path for the plurality of ball bearings connects ends of the substantially helical path track.

A ball nut assembly in accordance with the invention includes the ball nut and a lead screw in the axial bore. A plurality of ball bearings are between the substantially helical path track and the lead screw.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is an isometric view of a portion of a ball nut in accordance with the invention, with a cutaway to show interior detail;

FIG. 2 is a top view of a ball screw assembly incorporating the ball nut portion of FIG. 1;

FIG. 5 is an isometric, partially exploded view of the ball screw of FIG. 4.

FIG. 6 is an enlarged cross-section view, taken along the line 6—6 in FIG. 4.

FIG. 7 is an enlarged cross-section view of a portion of a prior art ball nut.

FIG. 8 is a cross-section view of a corresponding portion of the ball nut in FIGS. 5 and 6.

DETAILED DESCRIPTION OF THE INVENTION

Figure 3:
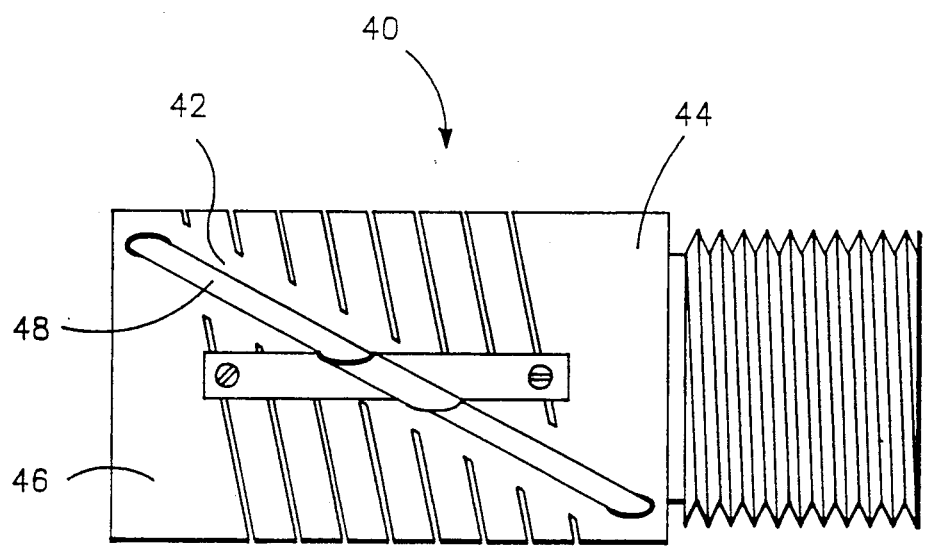
FIG. 3 is a similar top view of a second embodiment of a ball nut in accordance with the invention.

Turning now to the drawings, more particularly to FIGS. 1 and 2, there is shown a ball screw assembly 10 in accordance with the invention. The assembly 10 includes a ball nut 12 and a lead screw 14. The ball nut 12 has a construction which provides both a flexibility comparable to that achieved with the coil spring design and a stiffness of a solid ball nut body. The ball nut 12 consists of three sections: a head 16, a tail 18 and a connecting section 20. The connecting section 20 contains most of a ball circuit 22 in the form of a helical track 24, along which ball bearings 26 travel as the ball nut 12 and the lead screw 14 rotate with respect to each other. The head and tail sections 16 and 18 accommodate attachment to a load and connections 28 for return tube 30 for recirculating the ball bearings 26 after they travel along the helical track 24. The return tube 30 is held in place by a retaining strap 31, attached to the ball nut 12 at 33. The return tube 30 is either a solid tube bent to connect one end of the ball circuit 22 with the other or a set of two tube halves fabricated by stamping methods. The tube 30 has a pick up finger as an integral part of its configuration. The finger deflects the ball bearings 26 circulating in the ball groove 24 up and through the tube 30 and into the opposite end of the ball circuit 22. A separate deflector could also be positioned inside the ball groove 24 to deflect the ball bearings 26 up into the tube 30.

In accordance with this invention, a plurality of separate slots 32 are provided, essentially along the helical track 24 of the ball circuit 22. The slots 32 are generated between turns of the helical track 24 so that they do not interfere with the circulation of the ball bearings. The slots 32 are interrupted by a solid spine 34 along the length of the connecting section 20, so that the slots are separated segments of a single helical slot that would otherwise be defined along the section 20 as in the helical coil design.

Thus, unlike the helical flexure of the helical coil design, the slots 32 do not run in a continuous spiral around the ball circuit 22. They are interrupted by the spine 34. The spine 34 can be thought of as a backbone rigidly connecting the head and tail sections 16 and 18 of the ball nut 12. Segments 36 of the connecting section 20 between the slots 32 can be considered ribs connected to the backbone or spine 34. The rib segments 36 are therefore C springs, taking advantage of the spring nature of the hardened ball nut metal. The beginning of each C spring rib segment 36 is offset from its end by the pitch of the ball helical track 24. These C spring rib segments 36 are flexible and slightly compressive torsionally.

The backbone spine 34 supplies the rigid portion of the design, giving axial stiffness to the ball nut 12 by preventing the rib segments 36 from being totally collapsible as is the coil spring design. If desired, more than one spine 34 can be provided connecting the head and tail sections 16 and 18. By controlling the thickness and number of the spines 34 in the ball nut 12, the rib segments 36 are either made more or less flexible.

The ball nut 12 is then assembled to the lead screw 14 with selectively sized ball bearings 26 to take advantage of the C spring nature of the rib segments 36. The rib segments 36 apply a continuous, dynamic preload within the ball circuit 22, adjusting to thread 38 variations as the ball bearings 26 circulate through the ball circuit 22. The backbone spine 34 supplies axial stiffness to the assembly 10, preventing the ball nut 12 from either compressing or stretching.

In the ball nut 40 of FIG. 3, spine 42 extends diagonally between head and tail sections 44 and 46, along return tube 48. The spine 42 thus defines separate slots 50 and C spring segments 52, similar to the slots 32 and segments 36 of the FIGS. 1-2 embodiment. Other than as shown and described, the construction and operation of the FIG. 3 ball nut 40 is the same as the ball nut 12 of FIGS. 1-2.

Figure 4:
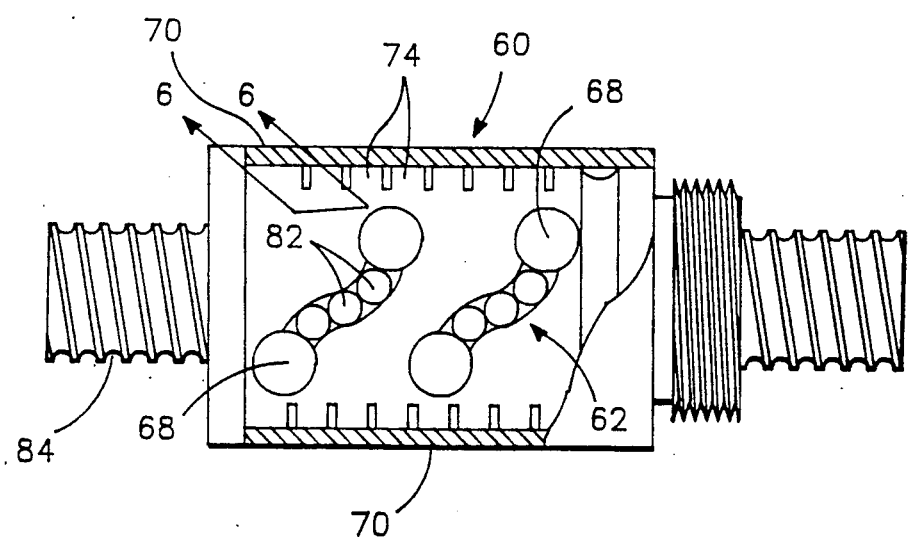
FIG. 4 is a similar top view of a third embodiment of a ball screw in accordance with the invention, but with a partial cross section to show interior detail.

FIGS. 4 and 5 show a ball nut 60 having internal return paths 62 for a pair of parallel helical tracks 64 (see FIG. 6) in place of the return tubes 30 and 48 in the FIGS. 1-3 embodiments. The return paths 62 are formed by grooves 66 machined into the body of the ball nut 60 from one end of the helical tracks 64 to the other. Return guide covers 68 and return guide inserts 69 are inserted into the ball groove tracks 64 on each end of the tracks. These covers 68 and inserts 69 divert the ball bearings through the grooves 66 and into the opposite end of the circuit formed by the helical tracks 64. The outside diameter of the ball nut 60 is covered by a friction fit sleeve 70 to retain the ball bearings in the grooves 66.

As in the ball nuts 12 and 40 of FIGS. 1-3, the ball nut 60 has a plurality of essentially C shaped slots 72, defining a plurality of rib segments 74 connected to a backbone spine 76, which connects head and tail sections 78 and 80 of the ball nut 60. Note that the spine 76 is wider than the spines 34 and 42 in FIGS. 1-3, making the ball nut 60 stiffer than the ball nuts 12 and 40.

The rib segments 74 supply the flexibility of the ball nut 60. Because of their C spring shape, they will flex slightly, altering the pitch of the portion of the ball groove tracks 64 that is contained inside the rib segment 74. Each rib segment 74 acts independently, flexing to alter the pitch as the variations of the lead screw affect the rolling path of ball bearings 82 circulating within the ball groove tracks 64. As described previously, the ball bearings 82 are selectively sized to create an interference fit within the ball circuit when ball screw 84 and the ball nut 60 are assembled. Without the flexibility of the rib segments 74, the ball bearings would jam inside the ball circuit, causing the assembly to run rough, if at all. The rib segments 74 respond to the potential points of interference, by moving slightly to relieve jamming. Conversely, when variations in the ball groove tracks 64 would cause play in the circuit, the rib segments 74 flex to cause compression, keeping the preload on the ball bearings.

As shown in FIG. 6, the ball groove tracks 64 have a "gothic arch" cross-section shape, formed by the intersection of two radii, which is by far the most commonly used track configuration in ball screw design. The rib segments 74 take advantage of the gothic arch shape. As the pitch of the ball screw 84 and ball nut 60 vary, the rib segments flex, keeping the ball bearings 82 in contact on at least two points 86 and 88 in the groove track 64 and groove 90 of ball screw 84. As the pitch varies, the rib segments 74 flex, allowing the ball bearings 82 to find the path of least resistance.

The area described by the gothic arch shape is always much larger than the nominal ball bearing diameter that it is designed to use. This allows for great variations in the diameters of the ball bearings 82 that can be used with the ball nut 60. Because of the larger size range that can be used in the groove track 64 and the groove 90, the correct diameter of ball bearings 82 to achieve the desired preload can be easily found without reaching the maximum ball bearing diameter that would fit the arches. It can be seen that the ball circle diameter will vary as the variations in the groove pitch cause the ball bearings to climb and descend the groove walls and as the diameter of the selected ball bearings 82 is increased or decreased to vary the preload obtained. The gothic arch groove 90 on the ball screw 84 remains fixed, because the screw 84 is solid. The pitch and grooves 64 inside the rib segments 74 flex.

FIGS. 7 and 8-11 show return path system designs 100 and 102 for the ball screw assembly 10 of FIGS. 1-2 and the ball screw assembly 60 of FIGS. 4-6, respectively. In FIG. 7, the return tube 30 has a conventional pick-off finger 104 that extends from the ball nut 12 into the helical track 24 toward the lead screw 14 to engage the ball bearings 26 for deflection from the helical track 24 into the return tube 30. The series of ball bearings 26 shows that the pick-off finger 104 produces an abrupt change of direction for the ball bearings 26 while they are still under load in the helical track 24.

Figure 9:
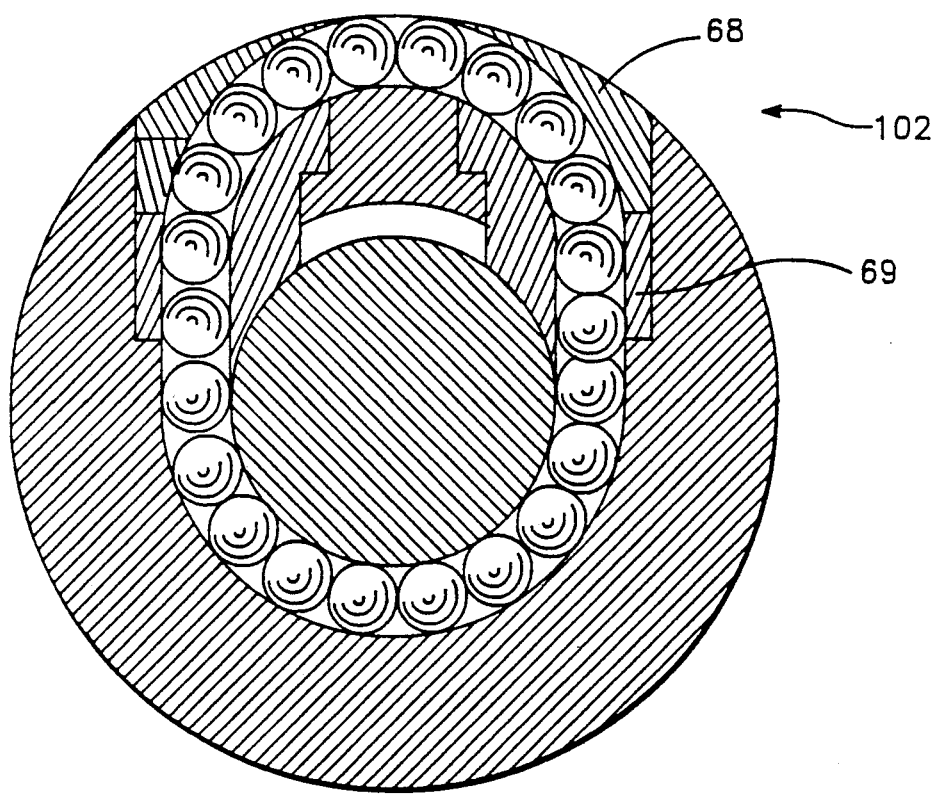
FIG. 9 is a cross-section view of a ball screw assembly incorporating the ball nut of FIG. 5.
Figure 10:
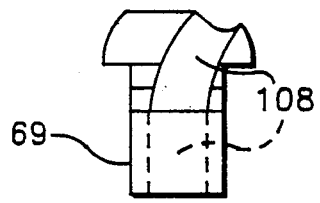
FIGS. 10 and 11 are perspective views of a portion of the ball nut of FIG. 5.
Figure 11:
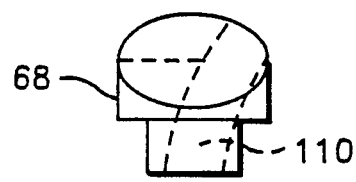

In the return path system 102, the ball bearings 82 are deflected from the helical track 64 and into the return path 62 by means of return guide insert 69 and the return guide cover 68. As is best shown in FIGS. 8 and 9, the ball bearings 82 are deflected by the return guide insert 69 smoothly in a tangential path under no load from the helical track 64. Thus, no abrupt change in direction for the ball bearings 82 while they are under load is encountered. The absence of load on the ball bearing 82 just entering the return guide insert is shown by the gap 103 between the ball bearing 82 and the wall of the helical track 64. As is best shown in FIGS. 10 and 11, the return guide insert 69 and the return guide cover 68 have tracks 108 and 110, respectively, which join together to connect the helical track 64 and the return path 62.

In practice, it has been found with the ball return system 102 that, for smooth operation, the ball bearings 82 should not make a turn or follow a path that has a radius of curvature less than twice the radius of the ball bearings.

Other than as shown and described, the construction and operation of the FIGS. 4-6 and 8-11 embodiment of the invention is the same as that of the FIGS. 1-3 and 7 embodiments.

It should now be readily apparent to those skilled in the art that a novel ball nut and ball nut assembly capable of achieving the stated objects of the invention has been provided. This ball nut achieves a high degree of flexibility and continuous dynamic preloading within a single ball nut, while maintaining a high degree of axial stiffness. This design thus combines the two most essential elements most needed in a universal preload ball nut design, flexibility and stiffness. This design will work well with all diameters and leads of ball screws while accommodating heavy loads and allowing for the inevitable variations in thread form. It is especially suited for use with low cost, rolled thread grade assemblies.

It should further be apparent to those skilled in the art that various changes in form and details of the invention as shown and described may be made. It is intended that such changes be included within the spirit and scope of the claims appended hereto.

What is claimed is:

1. A ball nut, which comprises a body having a head end, a tail end and a connecting section joining said head end and said tail end, said body having an axial bore extending through said body, said connecting section having a substantially helical path track on said axial bore for receiving a plurality of ball bearings for engaging threads of a lead screw, a solid backbone connecting said head end to said tail end, and a plurality of separate rib members attached to said solid backbone and comprising substantially C-shaped segments of a substantially helical shape corresponding to said substantially helical path track, and a return path for said plurality of ball bearings connecting ends of said substantially helical path track.

2. The ball nut of claim 1 in which said return path comprises a tube connected between said head end and said tail end.

3. The ball nut of claim 1 in which said return path comprises a groove in an outer surface of said body, said ball nut additionally having a sleeve over the outer surface of said body.

4. The ball nut of claim 3 in which said connecting section has a plurality of parallel substantially helical path tracks for receiving the plurality of ball bearings and a return path groove in the outer surface of said body for each of said plurality of parallel substantially helical path tracks.

5. The ball nut of claim 1 in which said return path includes a pick-off for said ball bearings connecting said substantially helical path track and said return path to deflect said ball bearings from said substantially helical path track while said ball bearings are under no load, said pick-off engaging said substantially helical path track tangent to said substantially helical path track, said pick-off comprising a return guide insert engaging said substantially helical path track and said return path including a return guide cover engaging said return guide insert, said return guide insert and said return path guide each having mating curved passages to define a smooth curve path from said substantially helical path track to said at least one return path.

6. The ball nut of claim 5 in which said substantially helical path track and said pick-off are configured and positioned relative to one another so that one of said plurality of ball bearings entering said pick-off is free of load when deflected from said substantially helical path track by said at least one pick-off.

7. A ball nut assembly, comprising the ball nut of claim 1, a lead screw in said axial bore, and a plurality of ball bearings between said substantially helical path track and said lead screw.

8. The ball nut assembly of claim 7 in which said lead screw has a rolled thread.

9. The ball nut assembly of claim 1 in which said substantially helical path track has a gothic arch cross section.

10. In a ball nut having a body with an axial bore having a spiral track for receiving a plurality of ball bearings between the spiral track and threads of a lead screw, the body having a head end, a tail end and a connecting section joining said head to said tail end, the improvement comprising a solid backbone on said connecting section extending between said head end and said tail end, and a plurality of rib sections each connected to said backbone and separated from one another by a plurality of slots.

11. A ball nut assembly, comprising the ball nut of claim 10, a lead screw in said axial bore, and a plurality of ball bearings between said substantially helical path track and said lead screw.

12. The ball nut assembly of claim 11 in which said lead screw has a rolled thread.

13. The ball nut assembly of claim 10 in which said substantially helical path track has a gothic arch cross section.

14. The ball nut of claim 10 additionally comprising a return path including a pick-off for said ball bearings connecting said spiral track and said return path to deflect said ball bearings from said spiral track while said ball bearings are under no load, said pick-off engaging said spiral track tangent to said spiral track, said pick-off comprising a return guide insert engaging said spiral track and said return path including a return guide cover engaging said return guide insert, said return guide insert and said return path guide each having mating curved passages to define a smooth curve path from said spiral track to said at least one return path.

15. The ball nut of claim 14 in which said spiral track and said pick-off are configured and positioned relative to one another so that one of said plurality of ball bearings entering said pick-off is free of load when deflected from said spiral track by said at least one pick-off.

* * * * *